(12) United States Patent
Fell et al.

(10) Patent No.: US 6,343,509 B1
(45) Date of Patent: Feb. 5, 2002

(54) GYROSCOPE

(75) Inventors: Christopher Fell, Plymouth; Colin Henry John Fox, Nottingham, both of (GB)

(73) Assignee: Bae Systems PLC, Hants (GB)

(*) Notice: Subject to any disclaimer, the term of this patent is extended or adjusted under 35 U.S.C. 154(b) by 0 days.

(21) Appl. No.: 09/409,668

(22) Filed: Sep. 30, 1999

Related U.S. Application Data

(63) Continuation of application No. PCT/GB99/00722, filed on Mar. 10, 1999.

(30) Foreign Application Priority Data

Mar. 14, 1998 (GB) .............................. 9805388

(51) Int. Cl.$^7$ .............................................. G01C 19/00
(52) U.S. Cl. .................................................. 73/504.13
(58) Field of Search .................. 73/504.13, 504.12, 73/504.02

(56) References Cited

U.S. PATENT DOCUMENTS

| | | | |
|---|---|---|---|
| 3,206,985 A | | 9/1965 | Christensen .................. 73/505 |
| 5,915,276 A | * | 6/1999 | Fell .......................... 73/504.13 |
| 5,932,804 A | * | 8/1999 | Hopkin et al. ............ 73/504.13 |

FOREIGN PATENT DOCUMENTS

| | | |
|---|---|---|
| EP | 0 461 761 | 12/1991 |
| EP | 0 729 010 | 8/1996 |
| GB | 2 154 739 | 9/1985 |
| GB | 2 318 184 | 4/1998 |

OTHER PUBLICATIONS

G. C. Newton, Jr.: A Rate Gyroscope Based on Interaction of Sonic Waves, IEEE Transactions on Automatic Control, vol. AC–10, No. 3, Jul. 1965, pp. 235–243, New York, US.

* cited by examiner

Primary Examiner—Richard A. Moller
(74) Attorney, Agent, or Firm—Kenyon & Kenyon

(57) ABSTRACT

A gyroscope for sensing rate on at least two axes includes a substantially planar vibratory resonator having a ring or hoop like shape, carrier mode drive means for causing the resonator to vibrate in a Cos $n_1\theta$ in-plane carrier mode where $n_1$ has an integer value of 2 or more. The gyroscope also includes support means for flexibly supporting the resonator, carrier mode pick off means for sensing in-plane movement of the resonator, X axis response mode pick off means for sensing out-of-plane Cos $n\theta$ response mode movement of the resonator in response to rotation of the gyroscope around the X axis, where n has a value of $n_1+1$ or $n_1-1$, and Y axis response mode pick off means for sensing out-of-plane Sin $n\theta$ response mode movement of the resonator in response to rotation of the gyroscope about the Y axis where n has a value $n_1+1$ or $n_1-1$, identical to that for the X axis response mode.

18 Claims, 9 Drawing Sheets

GYROSCOPE

RELATED APPLICATION

This application is a continuation of International Application No. PCT/GB99/00722 filed, Mar. 10, 1999.

BACKGROUND OF THE INVENTION

This invention relates to a gyroscope suitable sensing rate on at least two axes, and preferably on three axes.

Vibrating structure gyroscopes may be fabricated using a variety of different structures as the resonant element. These include beams, tuning forks, cylinders, hemispherical shells and rings. Successful commercial exploitation is dependent upon optimising the device performance while minimising the cost. An additional goal for some applications is reducing the size of the device.

Some conventional vibrating structure gyro designs are suitable for fabrication using modern micro-machining techniques. These may be constructed from bulk Silicon, poly-silicon or electro-formed metal. These fabrication methods provide the capability of producing miniature gyros in high volume and at reduced cost.

Many applications for gyroscopic devices require rate sensitivity about all three axes. Conventional vibrating structure gyros provide single axis rate sensitivity and therefore three devices are required which must be aligned along orthogonal axes. A vibrating structure gyro incorporating a resonator design which is inherently capable of sensing around three axes simultaneously would therefore be of great benefit. A single device would thus replace three conventional single axis units with obvious cost benefits. Also, the process of mounting and aligning the three single axis gyros would not be required.

There is thus a need for an improved gyroscope which can sense rate on at least two axes.

SUMMARY OF THE INVENTION

According to a first aspect of the present invention there is provided a gyroscope for sensing rate on at least two axes, including a substantially planar vibratory resonator having a substantially ring or hoop-like shape structure with inner and outer peripheries extending around a common axis, carrier mode drive means for causing the resonator to vibrate in a Cos $n_1\theta$ in-plane carrier mode, where $n_1$ has an integer value of 2 or more, support means for flexibly supporting the resonator and for allowing the resonator to vibrate, in response to the carrier mode drive means, relative to the support means, carrier mode pick-off means for sensing in-plane movement of the resonator, X axis response mode pick-off means for sensing out-of-plane Cos $n\theta$ response mode movement of the resonator in respect to rotation of the gyroscope around the X axis, where n has a value of $n_1+1$ or $n_1-1$, and Y axis response mode pick off means for sensing out-of-plane Sin $n\theta$ response mode movement of the resonator in respect to rotation of the gyroscope about the Y axis, where n has a value of $n_1+1$ or $n_1-1$, identical to that for the X axis response mode.

Preferably, the gyroscope includes X axis response mode drive means for nulling the X axis response mode movement of the resonator to permit the gyroscope to be operated in a forced feedback configuration.

Conveniently, the gyroscope includes Y axis response mode drive means for nulling the Y axis response mode movement of the resonator to permit the gyroscope to be operated in a forced feed back configuration.

Advantageously, for sensing rate about two axes the support means includes a plurality of flexible legs flexibly connecting the resonator to a support, with the number of legs $N_T$ being given by $N_T=4$ n and with the angular separation between the legs being given by $360°/N_T$.

Preferably, for sensing rate about three axes the gyroscope includes Z axis response mode pick off means for sensing in-plane Sin $n_1\theta$ response mode movement of the resonator in respect to rotation of the gyroscope around the Z axis, where $n_1$ has an integer value of 2 or more, identical to that for the in-plane carrier mode.

Conveniently, the gyroscope for sensing rate about three awes includes Z axis response mode drive means for nulling the Z axis response mode movement of the resonator to permit the gyroscope to be operated in a forced feedback configuration.

Advantageously, the support means includes a plurality of flexible legs flexibly connecting the resonator to a support, with the number of legs $N_T$ being given by $N_T=4$ $nn_1$ and with the angular separation between the legs being given by $360°/N_T$.

Preferably, in a gyroscope of the present invention for sensing rate about two axes the carrier mode is an in-plane Cos 2 $\theta$ mode, with the carrier mode drive means including two drive elements, for initiating the carrier mode motion, located at 0° and 180° with respect to a fixed reference axis in the plane of the resonator, with the carrier mode pick off means including two pick off elements, for detecting the carrier mode motion, located at 90° and 270° with respect to the fixed reference axis, wherein the X axis response mode is a Cos 3 $\theta$ mode, with the X axis pick off means including three pick off elements located at 0°, 120°, and 240° with respect to the fixed reference axis, with the X axis drive means including three drive elements located at 60°, 180° and 300° with respect to the fixed reference axis, and wherein the Y axis response mode is a Sin 3 $\theta$ mode, with the Y axis pick off means including three pick off elements located at 30°, 150° and 270° with respect to the fixed reference axis and with the Y axis drive means including three drive elements located at 90°, 210° and 330° with respect to the fixed reference axis, which X and Y axis drive and pick off elements are operable to detect and nullify the response mode motions.

Alternatively, the carrier mode is an in-plane Cos 3 $\theta$ mode, with the carrier mode drive means including three drive elements located at 0°, 120° and 240° with respect to a fixed reference axis in the plane of the resonator, with the carrier mode pick off means including three pick off elements located at 60°, 180° and 300° with respect to the fixed reference axis, wherein the X axis response mode is a Cos 2 $\theta$ mode, with the X axis pick off means including two pick off elements located at 0° and 180° with respect to the fixed reference axis, with the X axis drive means including two drive elements located at 90° and 270° with respect to the fixed reference axis, and wherein the Y axis response mode is a Sin 2 $\theta$ mode, with the Y axis pick off means including two pick off elements located at 45° and 225° with respect to the fixed reference axis and with the Y axis drive means including two drive elements located at 135° and 315° with respect to the fixed reference axis.

Conveniently, the carrier mode is an in-plane Cos 3 $\theta$ mode, with the carrier mode drive means including three drive elements located at 0°, 120° and 240° with respect to a fixed reference axis in the plane of the resonator, with the carrier mode pick off means including three pick off elements located at 60°, 180° and 300° with respect to the fixed reference axis, wherein the X axis response mode is a Cos 4 θ mode, with the X axis pick off means including four pick off elements located at 0°, 90°, 180° and 270° with respect to the fixed reference axis, with the X axis drive means including four drive elements located at 45°, 135°, 225° and 315° with respect to the fixed reference axis and wherein the Y axis response mode is a Sin 4 θ mode, with the Y axis pick off means including four pick off elements located at 22.5°, 112.5° and 292.5° with respect to the fixed reference axis, and with the Y axis drive means including four drive elements located at 67.5°, 157.5°, 247.5° and 337.5° with respect to the fixed reference axis.

Advantageously, a gyroscope for sensing rate of three axes, includes Z axis response mode pick off means for sensing in-plane Sin 2 θ response mode movement of the resonator, which Z axis pick off means includes two pick off elements located at 45° and 225° with respect to the fixed reference axis, and including Z axis response mode drive means having two drive elements located at 135° and 315° with respect to the fixed reference axis.

Preferably, a gyroscope for sensing rate on three axes, includes Z axis response mode pick off means for sensing in-plane Sin 3 θ response mode movement of the resonator, which Z axis pick off means includes three pick off elements located at 90°, 210° and 330° with respect to the fixed reference axis, and including Z axis response mode drive means having three drive elements located at 30°, 150° and 270° with respect to the fixed reference axis.

Advantageously, the resonator is made from metal, quartz, polysilicon or bulk silicon.

Advantageously the drive means and the pick off means are electrostatic, electromagnetic, piezoelectric or optical.

BRIEF DESCRIPTION OF THE DRAWINGS

For a better understanding of the present invention, and to show how the same may be carried into effect, reference will now be made, by way of example, to the accompanying drawings in which:

FIG. 1b shows the three orthogonal axes along which the velocity, rotation and force vectors lie with the structure of FIG. 1a;

DETAILED DESCRIPTION

A common feature of all conventional vibrating structure gyro designs is that they maintain a resonant carrier mode oscillation. This provides the linear momentum which produces the Coriolis force $F_c$, when the gyro is rotated around the appropriate axis. The magnitude of this force is given by:

$$F_c = 2 \Omega mv \quad (1)$$

where Ω is the applied rate, m is the mass and v the linear velocity. The velocity, rotation and force vectors lie along mutually orthogonal axes as shown in FIGS. 1a and 1b of the accompanying drawings.

Figure 1A:
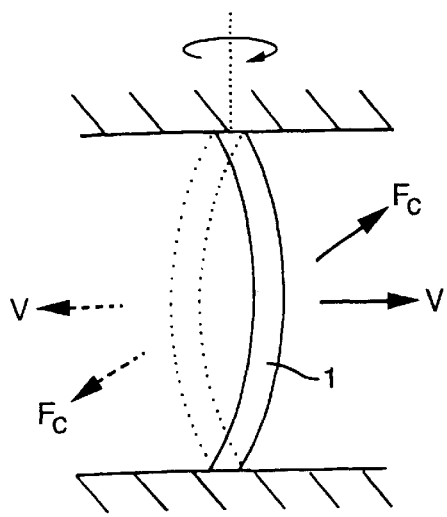
FIG. 1a is a schematic diagram of a vibrating structure gyroscope not according to the present invention.
Figure 1B:
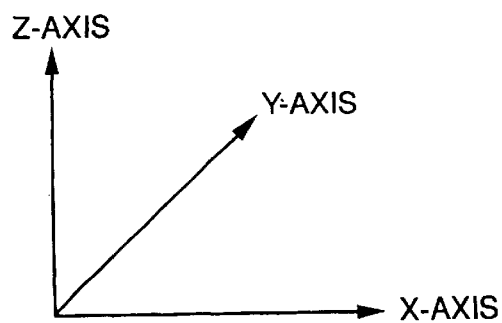

One of the simplest implementations for a vibrating structure gyro is a beam 1 shown in FIG. 1a. The carrier mode vibration is a bending motion in the xz-plane as shown in FIGS. 1a and 1b. A rotation applied about the axis of the beam 1 (z-axis) will generate Coriolis forces which set the beam 1 into motion in the yz-plane, at the carrier frequency. The amplitude of motion in this axis will be proportional to the applied rotation rate. The sensitivity of such a device may be enhanced by designing the structure such that the Coriolis force directly excites a resonant mode. The amplitude of motion is then amplified by the Q of the response mode. For a simple beam made of isotropic material this will be achieved using a beam of square cross-section where the X and Y dimensions are matched.

A rotation about the Y-axis will also induce Coriolis forces in the beam 1. These will act along the length of the beam (z-axis). The beam is extremely stiff in this direction and is therefore insensitive to these forces. However this simple linear vibration along a single axis is able to respond to rotations around two axes. Implementation of a practical gyroscope based on these responses requires a resonator design that enables these Coriolis force components to couple directly into response modes along the appropriate axes.

In order to produce a gyroscope capable of sensing rate along three axes the carrier mode motio must contain velocity components along two orthogonal axes. The structure must also be designed such that the Coriolis forces induced as a result of rotation about each axis couple into response modes whose resonant frequency may be matched to that of the carrier. Planar ring structures utilising Cos $n_1\theta$ in-plane carrier modes where $\theta$ is the angular location around the ring circumference relative to a fixed datum and $n_1$ has a fixed integer value of 2 or more, are particularly suited to this application. The $n_1=1$ mode is not a suitable carrier as it is a rigid body translation of a ring resonator and thus only has velocity components along a single axis.

Figure 2A:
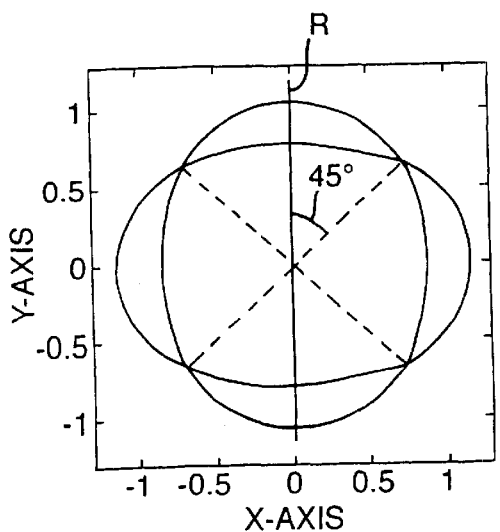
FIGS. 2a and 2b show graphically the shapes of mode pairs exhibiting Cos $n_1\theta$ and Sin $n_1\theta$ radial displacements for $n_1=2$.
Figure 2B:
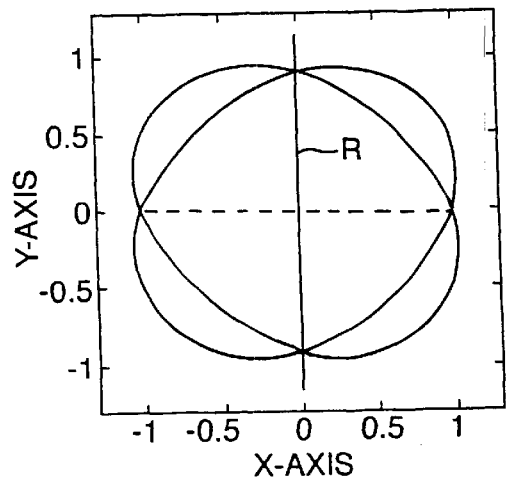
Figure 3A:
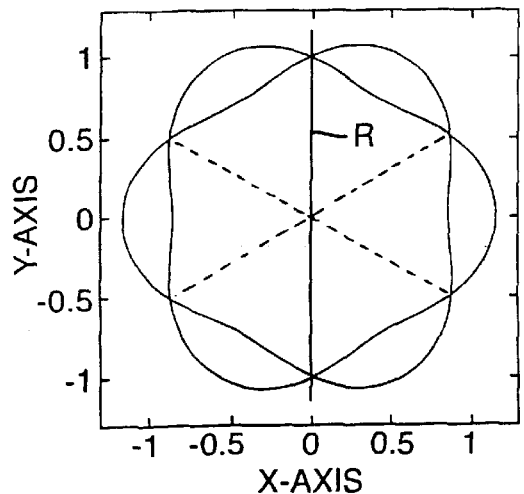
FIGS. 3a and 3b are graphical shapes similar to those of FIGS. 2a and 2b for n=3.
Figure 3B:
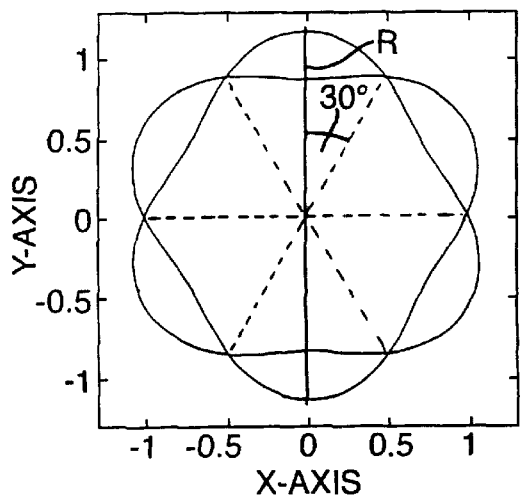
Figure 4A:
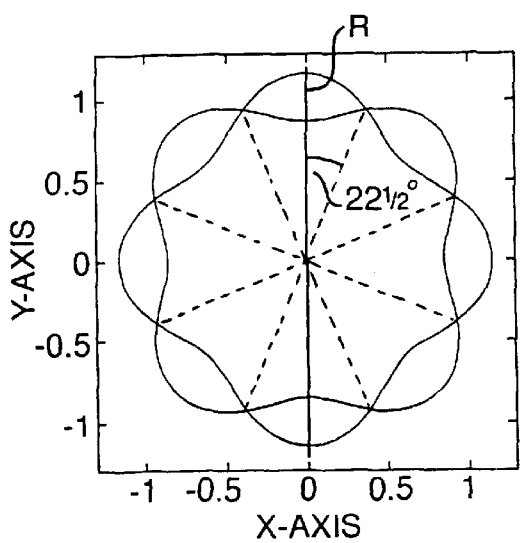
FIGS. 4a and 4b are graphical shapes similar to those of FIGS. 2a and 2b and FIGS. 3a and 3b but for $n_1=4$.
Figure 4B:
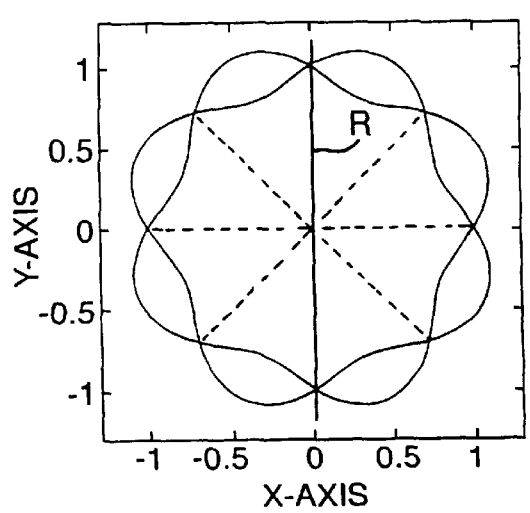

For perfect ring resonator structures the Cos $n_1\theta$ in-plane vibration modes exist as degenerate pairs at a mutual angle of $(90/n_1)°$. The $\theta=0°$ reference axis R for the modal diagrams is along the Y-axis in the positive direction. Using this fixed reference the lode pairs will have shapes exhibiting Cos $n_1\theta$ and Sin $n_1\theta$ radial displacements. The mode shapes for $n_1=2$ are shown in FIGS. 2a and 2b. The two extremes of maximum displacement from the unexcited ring position, during a single vibration cycle, are shown for each mode of the air. The axes indicate the displacement from the unexcited ring position for a ring of radius 1.0 (arbitrary units). The modes exist at a mutual angle of 45°. The mode shapes for $n_1=3$ are similarly shown in FIGS. 3a and 3b. These exist at a mutual angle of 30°. The corresponding shapes for the $n_1=4$ modes are shown in FIGS. 4a and 4b and exist at a mutual angle of 22.5°.

Vibrating structure gyro designs using ring structures, capable of sensing rate about a single axis, are well known. These use one of the in-plane Cos $n_1\theta$/mode pair (typically $n_1=2$) as the carrier. A rotation about the axis normal to the plane of the ring (z-axis) couples energy into the second mode of the pair with the induced amplitude of motion being proportional to the applied rate.

Using these carrier modes, rotations about axes in the plane of the ring will also give rise to Coriolis forces. These will act along the z-axis and will tend to set the ring into out-of-plane motion. The distribution of these forces will vary with angular position $\theta$ and, for rotation about the Y-axis, $\Omega_y$, will be given by:

$$F_c(\theta)=F_{n_1+1}\Omega_y \sin(n_1+1)\theta+F_{n_1-1}\Omega_y \sin(n_1-1)\theta \quad (2)$$

The parameters $Fn_1+1$ and $Fn_1-1$ are constants which depend on the precise geometry of the ring and the support means, the material and the value of $n_1$. The out-of-plane Coriolis force thus has components which vary as $\sin(n_1+1)\theta$ and $\sin(n_1-1)\theta$. For the same carrier mode, a rotation about the X-axis will induce Coriolis forces given by:

$$F_c(\theta)=F_{n_1+1}\Omega_x \cos(n_1+1)\theta+F_{n_1-1}\Omega y \cos(n_1-1)\theta \quad (3)$$

Figure 5A:
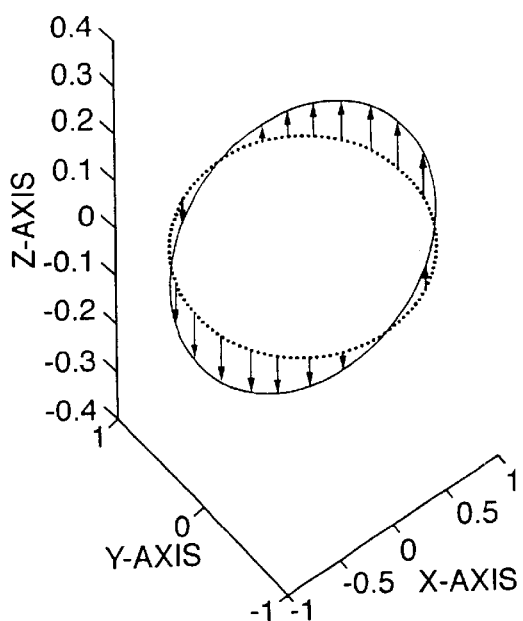
FIGS. 5a and 5b are graphical representations on three axes for the force components generated by a rotation of a gyroscope according to the present invention about the Y axis; for a Cos 2 θ in-plane carrier mode.
Figure 5B:
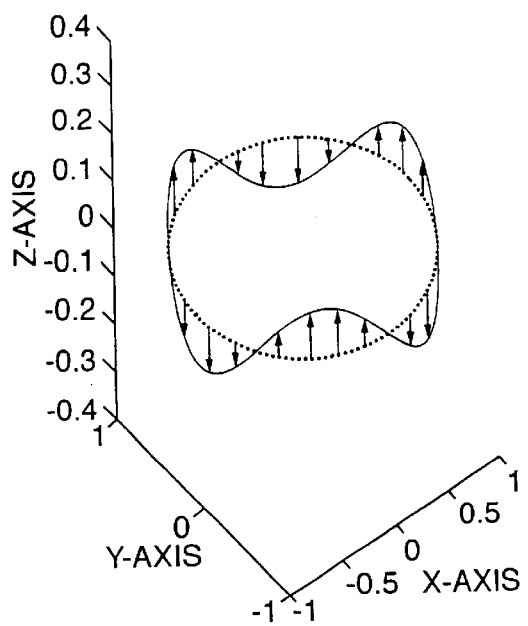

The out-of-plane Coriolis force in this instance has components varying as $\cos(n_1+1)\theta$ and $\cos(n_1-1)\theta$. By way of example, for the case where the carrier is the Cos 2 $\theta$ in-plane mode shown in FIG. 2a, a rotation about the Y-axis will generate force components which vary as Sin $\theta$ and sin 3 $\theta$. These are shown in FIGS. 5a and 5b, respectively. A rotation about the X-axis will generate components which vary as Cos $\theta$ and cos 3 $\theta$. These are shown in FIGS. 6a and 6b.

Figure 7A:
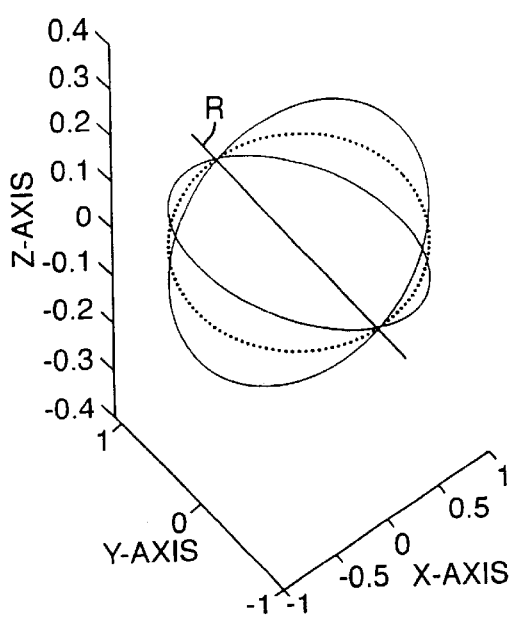
FIGS. 7a and 7b are graphical representations on three axes of the vibration mode shapes exhibiting Cos nθ and Sin nθ out-of-plane displacements for n=1.
Figure 7B:
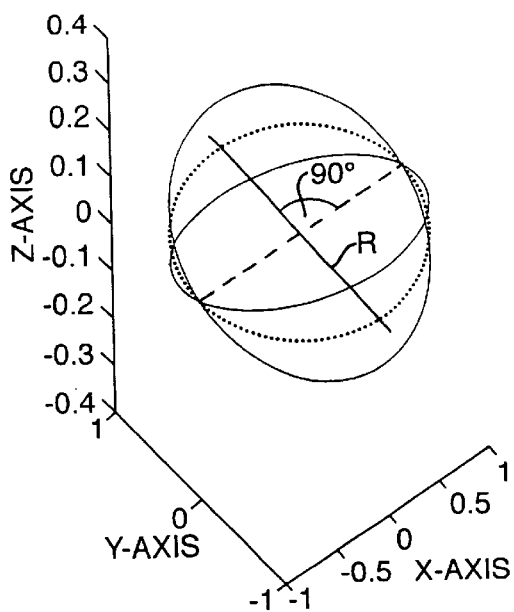
Figure 8A:
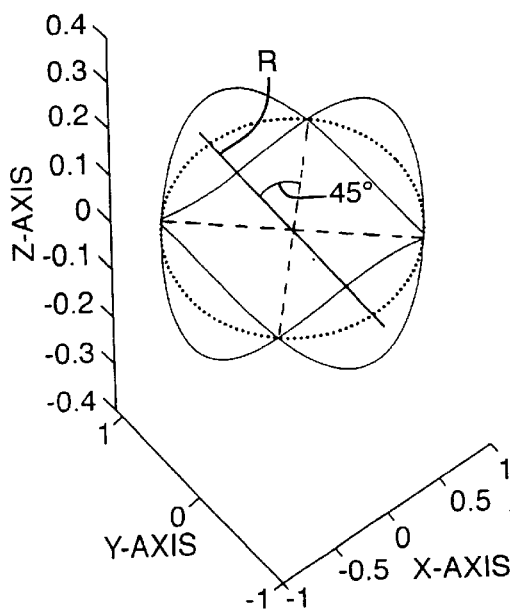
FIGS. 8a and 8b are graphical representations similar to those of FIGS. 7a and 7b but for n=2.
Figure 8B:
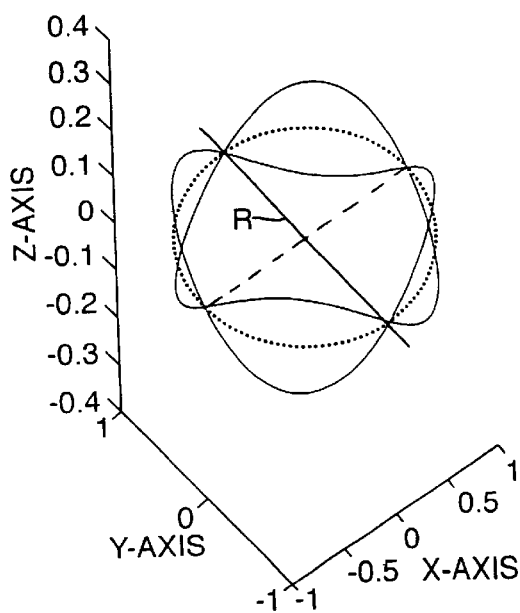
Figure 9A:
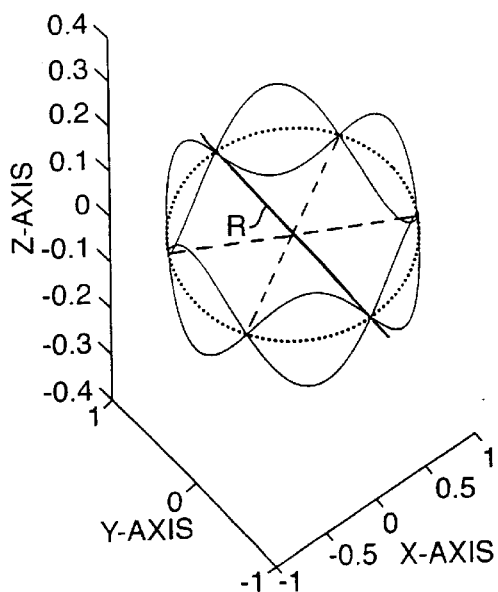
FIGS. 9a and 9b are graphical representations similar to those of FIGS. 8a and 8b but for n=3.
Figure 9B:
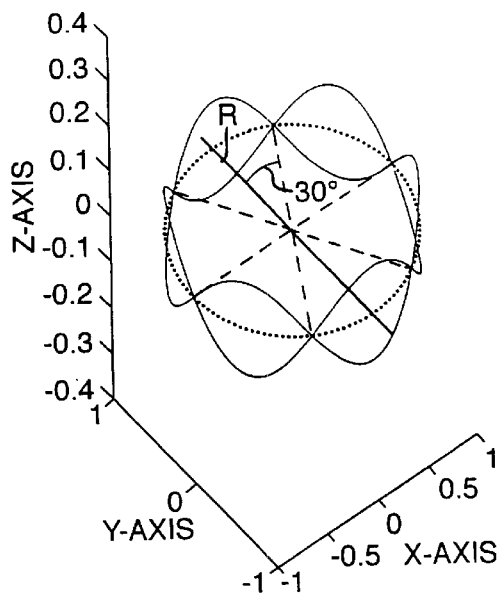
Figure 10A:
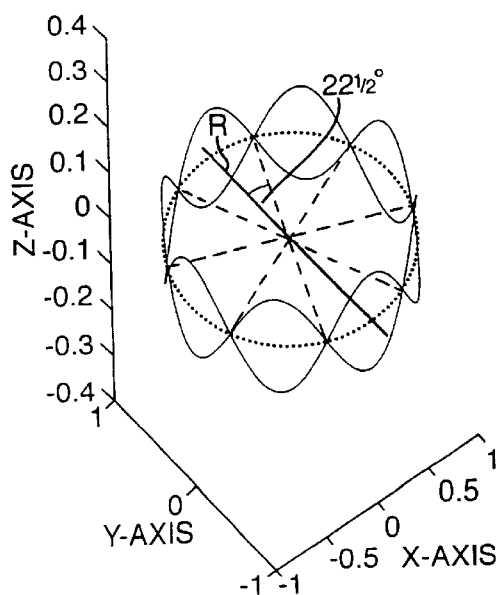
FIGS. 10a and 10b are graphical representations similar to those of FIGS. 9a and 9b but for n=4.
Figure 10B:
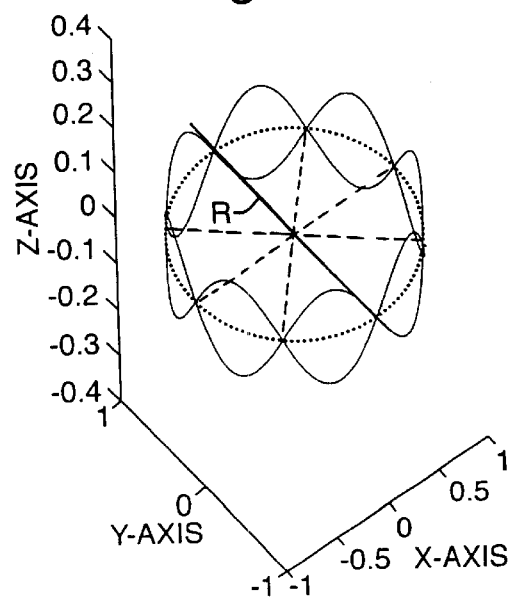

The z-axis displacement of the out-of-plane modes will also exhibit a Cos $n\theta$ angular dependence and, like the in-plane modes these exist as degenerate pairs at a mutual angle of $(90/n)°$. The mode shapes for n=1 exist at a mutual angle of 90° (i.e. Sin $\theta$ and Cos $\theta$ radial displacements) and are shown in FIGS. 7a and 7b. As with the previous modal diagrams, the two extremes of motion are shown with the rest position of the ring indicated by the broken lines. The corresponding plots for the n=2, 3 and 4 modes are shown in FIGS. 8a, 8b, 9a, 9b, 10a and 10b.

Figure 6A:
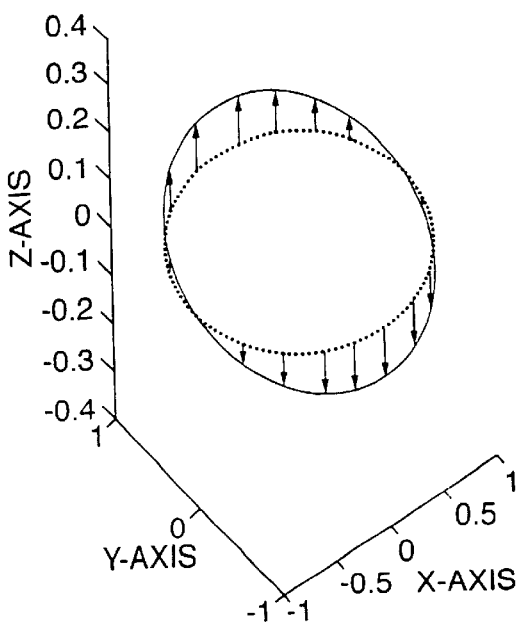
FIGS. 6a and 6b are similar graphical representations to those of FIGS. 5a and 5b but representing rotation about the X axis.
Figure 6B:
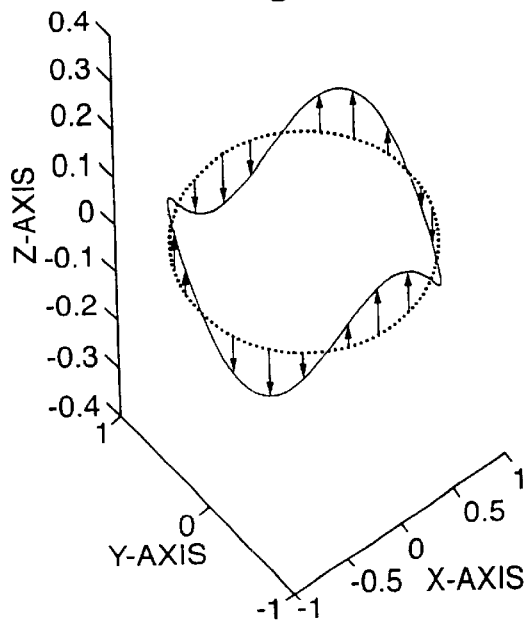

The functional forms of the Coriolis force components shown in FIGS. 5a and 6a precisely match those of the n=1 out-of-plane mode shown in FIGS. 7a and 7b. Similarly, the forms of the Coriolis force components shown in FIGS. 5b and 6b precisely match those of the n=3 out-of-plane modes shown in FIGS. 9a and 9b. Clearly these modes may be directly excited as a result of the rotation induced Coriolis forces.

Examination of equations 2 and 3 indicates that any Cos $n_1\theta$ in-plane carrier mode can couple into $\cos(n_1+1)\theta$, $\sin(n_1+1)\theta$, $\cos(n_1-1)$ and $\sin(n_1-1)\theta$ out-of-plane modes when rotated around the appropriate axis. To be of practical use in any gyro configuration, the amplitude of motion generated must be as large as possible to maximise the gyro sensitivity. This is achieved by matching the mode frequencies of the carrier and a chosen pair out-of-plane response modes. The resultant motion is thus amplified by the Q of the response mode vibration. The in-plane mode frequencies are not affected by changing the depth (ie z-axis dimension) of the ring. The out-of-plane mode frequencies are directly sensitive to this parameter and may therefore be independently adjusted. By judicious control of the dimensions of the ring resonator and support structure it is possible to match the Cos $n_1\theta$ in-plane carrier frequency with either the $\cos(n_1+1)\theta$ and $\sin(n_1+1)\theta$ or the $\cos(n_1-1)\theta$ and $\sin(n_1-1)\theta$ out-of-plane modes. It is therefore possible to design multi-axis gyro schemes using a variety of carrier and response mode combinations.

The Cos 2 $\theta$ carrier mode can couple into the Sin $\theta$, Cos $\theta$, Sin 3 $\theta$ and Cos 3 $\theta$ out-of-plane response modes. These are shown in FIGS. 7a, 7b, 9a and 9b respectively. The use of the Cos 2 $\theta$ carrier in combination with the Sin 3 $\theta$ and Cos 3 $\theta$ response modes according to the present invention is capable of being implemented as a three axis rate sensor.

The resonator in a vibrating structure gyro preferably is substantially planar having a ring or hoop like shape resonator structure 2 with inner and outer peripheries extending around a common axis A normal to a fixed reference axis R in the plane of the resonator structure 2, which axis R extends in the direction of the Y axis. The ring structure is supported by support means including a plurality of compliant support legs 3. When driven in a Cos 2 $\theta$ carrier mode both the ring and support legs are in motion. However, the ring 2 is very stiff in comparison to the support legs 3 and the carrier frequency is predominantly set by the ring dimensions. This effectively isolates the resonator from the mounting and reduces environmental sensitivity.

The Sin $\theta$ and Cos $\theta$ out-of-plane modes (FIGS. 7a and 7b) will involve significant deflection and stress in the support legs 3 with insignificant distortion of the ring 2. Due to the compliance of the legs this Cos $\theta$ mode naturally occurs at a significantly lower frequency than the Cos 2 $\theta$ carrier. The Sin 3 $\theta$ and Cos 3 $\theta$ response modes (FIGS. 9a and 9b) distort and stress the ring significantly. Its natural mode frequency will therefore be significantly higher than that of the Cos $\theta$ mode. The Cos 2 $\theta$ carrier and the Sin 3 $\theta$ and Cos 3 $\theta$ response mode frequencies may thus be matched with considerably less adjustment of the leg to ring stiffness ratio. This helps to maintain the environmental capability of the gyroscope.

When using the out-of-plane Cos $\theta$ response modes, the legs 3 will always transmit a non-zero torque to the support structure as the ring 2 rocks about the input rotation axis. In contrast, the out-of-plane Sin 3 $\theta$ and Cos 3 $\theta$ response mode will not transmit any net reaction force to the support structure if an appropriate number of legs are used. This will be true for all Cos nθ modes where n>1.

Practical gyroscopes of the present invention may be constructed using higher order in-plane carrier modes. The Cos 3 θ in-plane mode (FIG. 3b) may be used as the carrier in conjunction with either the Cos 2 θ and Sin 2 θ or the Cos 4 θ and Sin 4 θ out-of-plane response modes. These response modes are shown in FIGS. 8a, 8b, 10a and 10b respectively. The Cos 4 θ carrier (FIG. 4a) will couple into the Sin 3 θ, Cos 3 θ, Sin 5 θ and Cos 5 θ response modes. Corresponding combinations of higher order are also feasible. In practice, however, the higher order mode combinations become increasingly onerous to implement. The mode shapes become progressively more complex and require a larger number of discrete drive and pick off elements to excite and sense the vibrations. Also, the support legs 3 act as point spring masses which perturb the mode frequencies. The number and location of these legs need to be matched to the mode symmetry to avoid induced splitting of the degenerate mode frequencies. The number of legs required increases rapidly with the mode order thus rendering some designs impractical on a small size gyroscope.

A three axis gyroscope according to the present invention may be constructed by using a combination of Sin 2 θ and Cos 2 θ in-plane and the Sin 3 θ and Cos 3 θ out-of-plane modes. This gyroscope requires the frequencies of four modes to be matched (one carrier plus three response modes). However, for a perfectly symmetric ring 2 of uniform thickness, the Sin 2 θ and Cos 2 θ mode pair will have identical frequencies. Similarly, the Sin 3 θ and Cos 3 θ mode pair will also be matched. Therefore, due to the high degree of symmetry, the design of the resonator dimensions is, in practice, reduced to an exercise in matching only two frequencies (ie those of the two degenerate mode pairs). For the dimensions commonly used in ring resonators designed for single axis operation the Cos 3 θ out-of-plane and Cos 2 θ carrier mode frequencies naturally occur relatively closely matched in frequency. Adjusting the depth (z-axis dimension) of the ring does not alter the in-plane frequencies. It does, however, have a distinct affect of the out-of-plane frequencies. Matching the Sin 2 θ, Cos 2 θ, Sin 3 θ and Cos 3 θ mode frequencies may therefore be achieved by appropriate adjustment of a single ring dimension.

In terms of the mode dynamics, the support legs 3 appear as point spring masses acting at the point of attachment which differentially perturb the mode frequencies. In order to prevent frequency splitting and maintain the positional indeterminacy of the modes, the number and location of the legs must be matched to the mode symmetry. For any Sin $n_1\theta$ and Cos $n_1\theta$ mode pair this necessitates the use of 4 $n_1$ equi-angularly spaced legs (where $n_1$ is 2 or more). The Sin 2 θ and Cos 2 θ in-plane modes therefore require 8 equally spaced legs. The Sin 3 θ and Cos 3 θ out-of-plane modes require 12 legs to maintain their indeterminacy. To satisfy this requirement simultaneously for both mode pairs implies the use of 24 legs equally spaced at 150 intervals around the ring 2. This number is the lowest common multiple of the in-plane and out-of-plane leg numbers and may be derived for any three axis gyro mode combination from the following expression:

$$\text{Number of legs } N_T = n \times n_1 \times 4 \quad (4)$$

The angular spacing of these legs is given by $[360/N_T]°$.

Figure 11A:
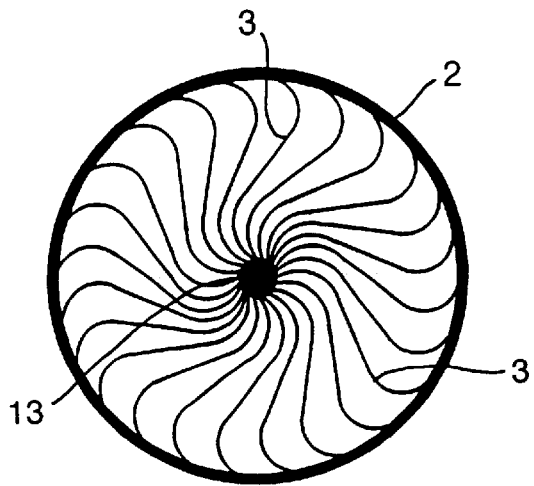
FIG. 11a shows in plan view a diagrammatic example of a resonator and support legs suitable for use in a gyroscope according to the present invention.
Figure 11B:
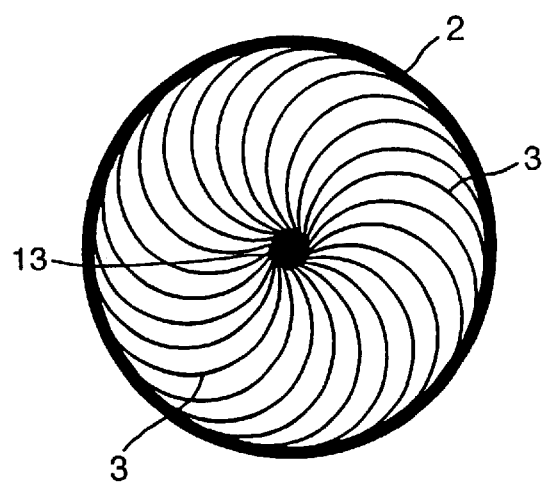
FIG. 11b shows in plan view a further resonator and support leg structure for use with a gyroscope according to the present invention.

For planar ring resonator structures the support legs 3 are designed such that the modal behaviour is dominated by the ring characteristics. This requires the legs to be radially and tangentially compliant, in comparison to the ring itself. Many design variations are possible which achieve these requirements. FIGS. 11a and 11b show two possibilities for the twenty-four support leg structure of one embodiment of the present invention. These designs are consistent with the use of larger numbers of support legs 3.

Vibrating structure gyroscopes of the invention may be constructed using standard fabrication and machining techniques. They are also suitable for fabrication using micro-machining techniques. The principle of operation and drive and pick off orientations will be identical regardless of the fabrication route. The resonator may be constructed from any material possessing suitable mechanical properties including metal, quartz, polysilicon or bulk silicon. The ring 2 may be driven into oscillation using a variety of drive means. These include electrostatic, electromagnetic, piezo or optical means. The amplitude of motion may similarly be detected using electrostatic, electromagnetic, piezo or optical pick off means.

Figure 12:
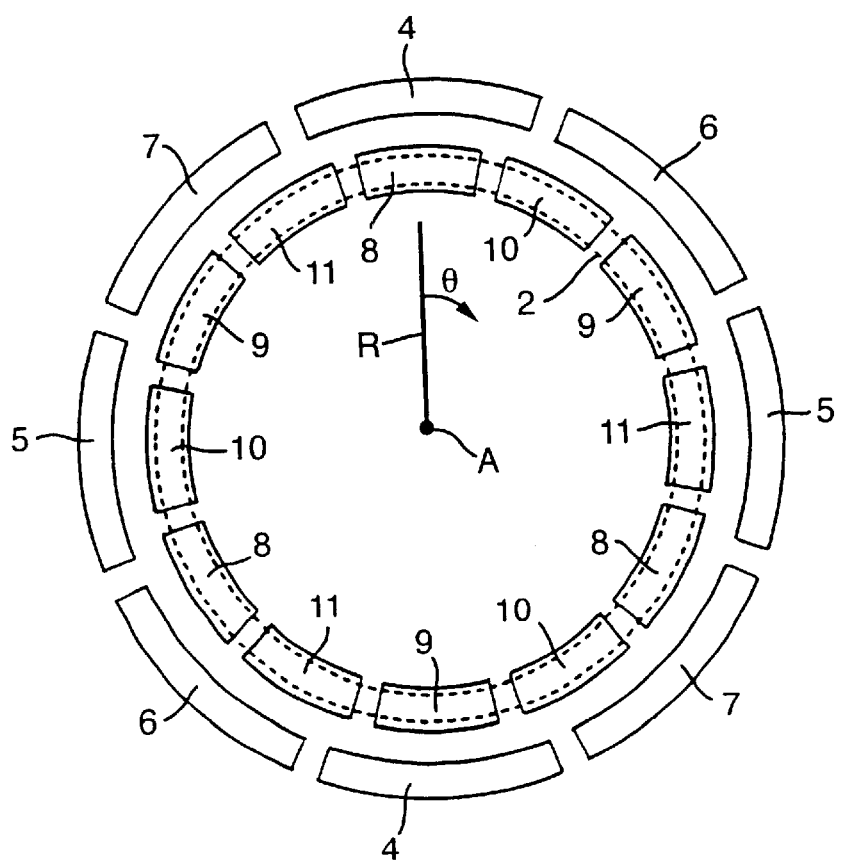
FIG. 12 is a schematic diagram in plan view of part of a gyroscope according to a first embodiment of the present invention showing drive and pick off elements.

The preferred three axis gyroscope embodiment uses electrostatic drive and pick off means. The orientation of drive and pick off elements for this embodiment is shown in FIG. 12. The location of the ring 2 is indicated by the dashed lines. The in-plane Cos 2 θ carrier mode is driven into oscillation using drive elements 4 whose effective centres are located at 0° and 180° around the outer periphery of the ring 2 with respect to the fixed reference axis R. For each element, the surface normal to the plane of the ring 2 facing the ring circumference forms one plate of the capacitor with the facing segment of the ring circumference forming the other plate. The ring 2 is maintained at a fixed potential with respect to the drive elements 4. An oscillating voltage applied to the drive element plates at the carrier mode frequency will generate an electrostatic force setting the ring 2 into oscillation. Pick off elements 5, for the carrier mode located at 90° and 270° with respect to the fixed reference axis R, similarly form capacitors with the facing ring segments and are used to detect the motion of the ring 2 as the capacitor gap varies. Pick off elements 6 located at 45° and 225° with respect to the axis R detect the amplitude of the in-plane Sin 2 θ response mode when the gyroscope is rotated around the z-axis. Z axis drive elements 7 located at 135° and 315° with respect to the axis R, may be used to null the mode movement to allow the gyroscope to operate in a forced feedback configuration. When operated in this mode the nulling drive is proportional to the applied rate. This mode of operation provides performance advantages over the open loop mode.

The Cos 3 θ out-of-plane response mode providing the X-axis rate sensitivity will have anti-nodes at 0°, 60°, 120°, 180°, 240° and 300° locations, with respect to the axis R, around the ring circumference. The sin 3 θ Y-axis response mode will have anti-nodes at 30°, 90°, 150°, 210°, 270° and 330° with respect to the axis R. Drive and pick off elements may be located at any appropriate combinations adjacent to these points. Conveniently, twelve plate like elements are positioned directly under the rim to form capacitors between said plates and the parallel facing segments of the bottom surface of the ring. Conveniently, the plates should extend beyond the inner and outer edges of the ring rim. The in-plane motion of the carrier mode will not therefore change the effective plate area and will not be inadvertently detected by these plate like elements. Elements 8 located at 0°, 120° and 240° are used as X-axis pick off elements. The signals from these elements will be in phase and may be conveniently summed together to give enhanced sensitivity in detecting the mode movement. Plate like elements 9 located at 60°, 180° and 300° with respect to the axis R are used as drive elements with the same drive voltage being applied to all these elements to null the motion to facilitate force feedback operation. Similarly, plate like elements 10 located at 30°, 150° and 270° with respect to the axis R are the Y-axis pick off elements with plate like elements 11 located at 90°, 210° and 330°, with respect to the axis R forming the drive elements for that mode.

Figure 13:
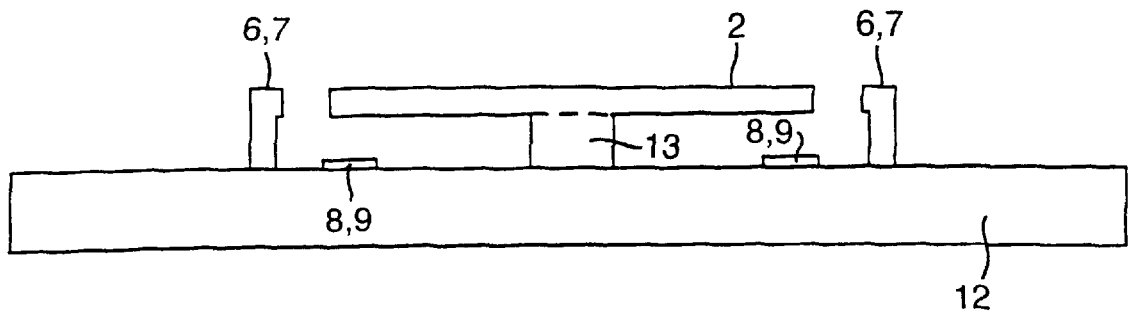
FIG. 13 is a cross sectional view on a diagonal of the structure of FIG. 12 showing additional detail.

FIG. 13 shows a cross-section view through the centre of the resonator ring 2 along the Y-axis showing additional detail of the device architecture. The X and Y axis drive and pick off elements are conductive sites laid onto the surface of an electrically insulating substrate layer 12. These element sites are connected via tracks to bond pads (not shown) which can be electrically connected to the control circuitry. The ring 2 is attached, via the support legs 3, to a central support pedestal 13. This pedestal extends beneath the ring 2 and attaches rigidly to the substrate layer 12 such that the ring and support legs are freely suspended above the substrate layer. The in-plane mode drives and pick off elements are rigidly attached to the substrate 12 with tracking and bond pads provided as require to enable connection to the control circuitry.

Modifications to this structure are possible. The addition of a second insulating substrate layer rigidly fixed above the resonator ring 2, duplicating the out-of-plane drive and pick off element capacitor plate array, would enhance the sensitivity of the gyroscope along the X and Y axes. This would, however, complicate the fabrication process and would not alter the essential design features or functionality of the gyroscope.

A two axis gyroscope according to the present invention may be fabricated using the same Cos 2 θ in-plane carrier mode and Sin 3 θ and Cos 3 θ out-of-plane response modes. For this embodiment the resonator design is such that the in-plane Sin 2 θ and Cos 2 θ mode frequencies are deliberately separated. Advantageously, this frequency split will fix the carrier mode position at a known angular location which may be aligned to the carrier mode drive and pick off means. The carrier mode frequency must still be matched to that of the out-of-plane response modes. If twelve support legs 3 are used then the symmetry of the Cos 3 θ modes is maintained. This will, however, generate a splitting of the in-plane Sin 2 θ and Cos 2 θ modes and thus fix the mode positions as required. Generally, for two axis gyroscope operation the required number of support legs is given by the following expression:

Number of legs $N_T = n \times 4$ (5)

The angular spacing is $[360/N_T]°$.

Figure 14:
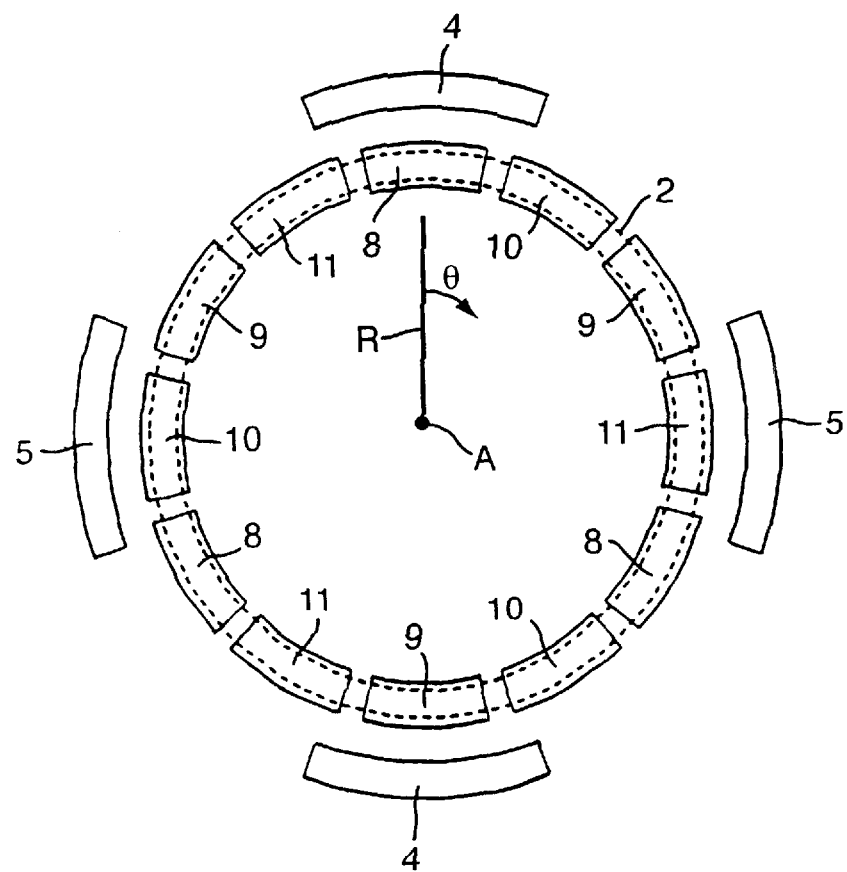
FIG. 14 is a schematic plan view of part of a gyroscope according to a second embodiment of the present invention.

This implementation will provide rate sensitivity about the X and Y axes only. The in-plane response mode drive and pick off means are thus not required. FIG. 14 shows a schematic of the gyroscope layout for this embodiment. This is essentially the same as the three axis embodiment of FIGS. 12 and 13, with the exception of the absence of the Z axis in-plane response mode drive elements 7 and pick off elements 6 and the different number of support legs, and hence like reference numerals have been used. No further description will therefore be given.

Figure 15:
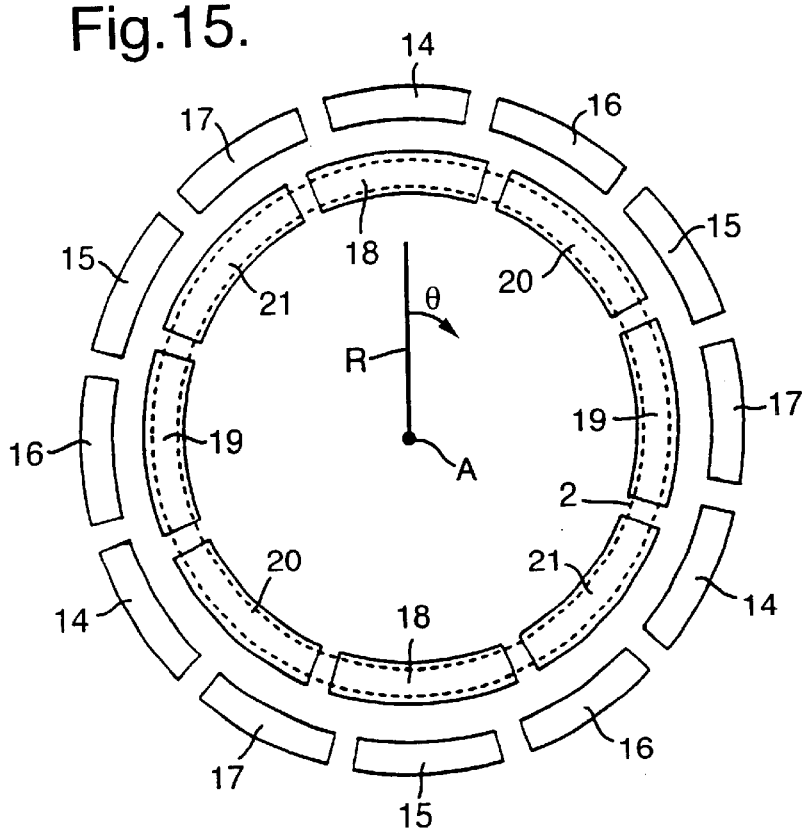
FIG. 15 is a diagrammatic plan view of part of a gyroscope according to a third embodiment of the present invention.

A two or three axis gyroscope may be fabricated using Sin 3 θ and Cos 3 θ in-plane modes in conjunction with sin 2 θ and Cos 2 θ out-of-plane response modes. For the three axis embodiment the degeneracy of both the in-plane sin 3 θ and Cos 3 θ and out-of-plane Sin 2 θ and Cos 2 θ mode pairs must be maintained. This dictates the use of twenty-four support legs 3 on the resonator ring 2. A schematic of the orientation of the drive and pickoff elements is shown in FIG. 15. The topology of the gyroscope is largely identical to the previously described embodiments with the exception of the drive and pick off element layout. The Cos 3 θ in-plane carrier drive means elements 14 are located at 0°, 120° and 240° with respect to the fixed reference axis R with the pick off means elements 15 located at 60°, 180° and 300° with respect to the axis R. The Z axis sin 3 θ in-plane response mode drive elements 16 are located at 30°, 150° and 270° with respect to the axis R with the pick off elements 17 at 90°, 210° and 330° with respect to the axis R. The out-of-plane Cos 2 θ X axis response mode pick off elements 18 are located at 0° and 180° with the nulling drive elements 19 at 90° and 270° with respect to the axis R. The Y axis out-of-plane Sin 2 θ pick off elements 20 are located at 45° and 225° with respect to the axis R with the nulling Y axis drive elements 21 at 135° and 315° with respect to the axis R.

Figure 16:
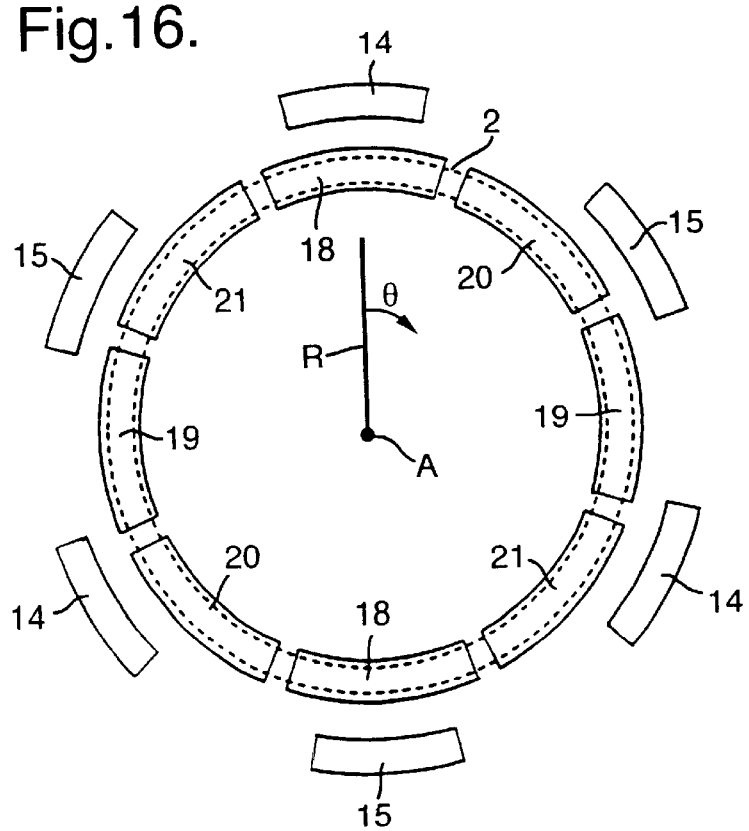
FIG. 16 is a diagrammatic plan view of part of a gyroscope according to a fourth embodiment of the present invention.

The two axis embodiment of this Cos 3 θ in-plane carrier and out-of-plane Sin 2 θ and Cos 2 θ response mode combination requires the in-plane mode degeneracy to be lifted. This may be achieved by the use of eight support legs. Otherwise, this embodiment differs from the three axis one only in the omission of the in-plane response mode drive elements 16 and pick off elements 17. The drive and pick off means layout is shown in FIG. 16.

Figure 17:
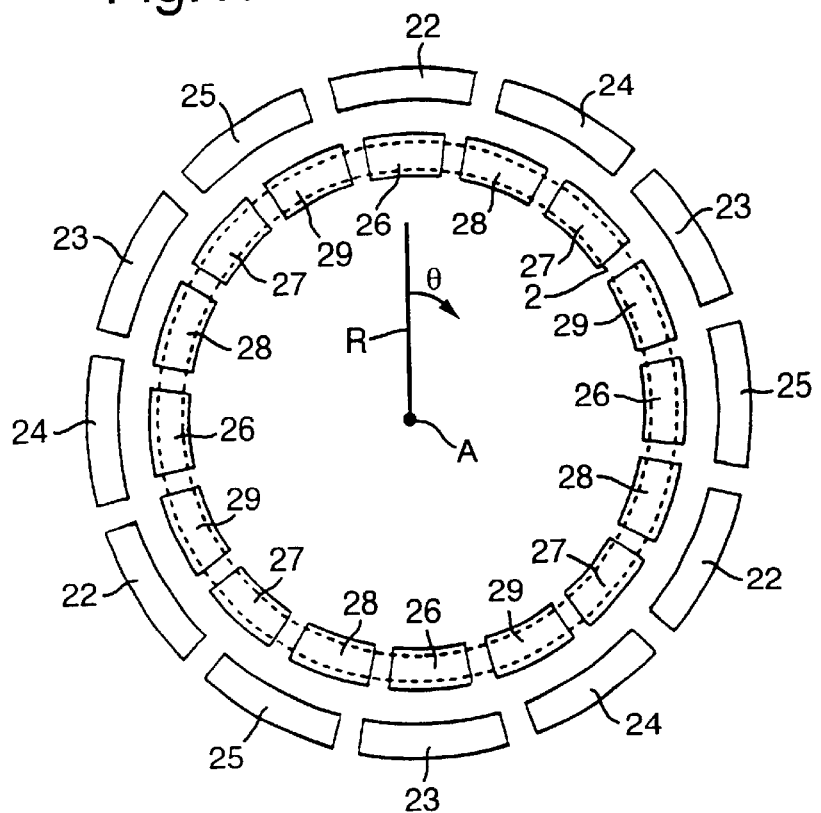
FIG. 17 is a diagrammatic plan view of part of a gyroscope according to a fifth embodiment of the present invention.

A two or three axis gyroscope of the invention may be fabricated using a Sin 3 θ and Cos 3 θ in-plane and a Sin 4 θ and Cos 4 θ out-of-plane mode combination. The three axis embodiment requires the use of forty-eight support legs 3 to maintain all the appropriate mode symmetries. This embodiment is shown schematically in FIG. 17. The Cos 3 θ in-plane carrier mode drives 22 are located at 0°, 120° and 240° with respect to the fixed reference axis R with the pick off elements 23 at 60°, 180° and 300° with respect to the axis R. The in-plane Z axis Sin 3 θ response mode drive elements 24 are located at 30°, 150° and 270° with respect to the axis R with the z axis Cos 3 θ mode in-plane pick off elements 25 at 90°, 210° and 300° with respect to the axis R.

The X axis Cos 4 θ out-of-plane response mode pick off elements 26 are located at 0°, 90°, 180° and 270° with respect to the fixed reference axis R, with X axis Cos 4 θ out-of-plane response mode nulling drive elements 27 at 45°, 135°, 225° and 315° with respect to the axis R. The Y axis Sin 4 θ out-of-plane response mode pick off elements 28 are located at 22.5°, 112.5°202.5° and 292.5° with respect to the axis R with Y axis Sin 4 θ out-of-plane response mode nulling drive elements 29 at 67.5°, 157.5°, 247.5° and 337.5° with respect to the axis R.

Figure 18:
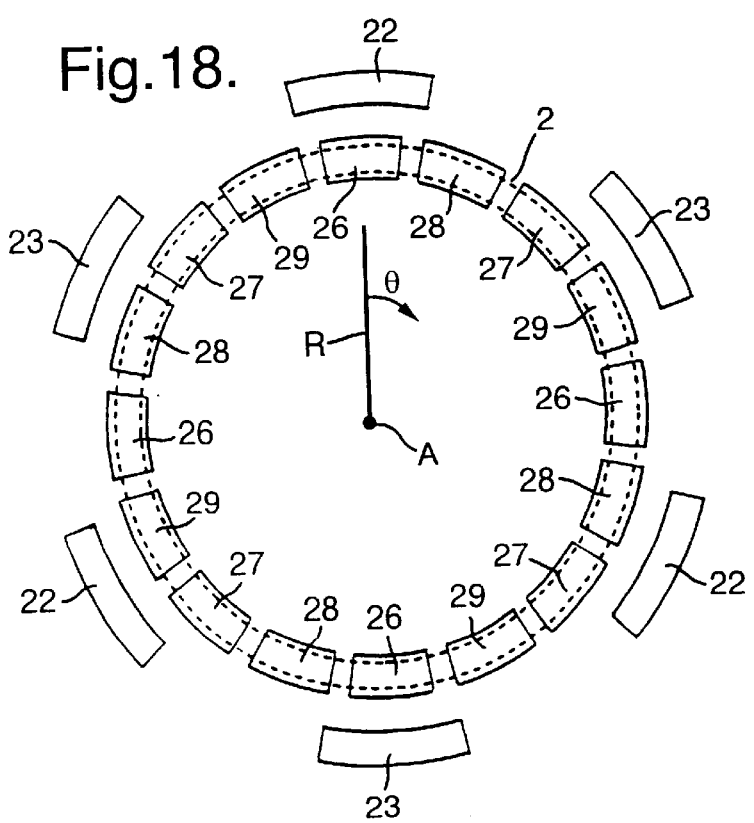
FIG. 18 is a diagrammatic plan view of part of a gyroscope according to a sixth embodiment of the present invention.

The corresponding two axis gyroscope embodiment of the invention requires sixteen support legs 3. The layout for this embodiment, shown in FIG. 18, is otherwise identical to the three axis one of FIG. 17 with the exception of the omission of the z axis in-plane response mode drive elements 24 and pick off elements 25. Like parts have been given like numbers to those of FIG. 17 and will not be further described.

Two and three axis rate sensors may be fabricated using higher order in-plane and out-of-plane mode combinations. These will require progressively higher numbers of support legs to maintain the necessary mode symmetries and a larger number of drive and pick off elements. As a result of this these embodiments, while feasible, become progressively more complicated to fabricate, particularly in a small size gyroscope.

Additionally in a gyroscope of the invention for sensing rate about two axes, the resonator 2 and support means are dimensioned so that the Cos $n_1\theta$ in-plane carrier mode and Sin $n\theta$ and Cos $n\theta$ out-of-plane response mode frequencies are matched, and for sensing rate about three axes the dimensions are such that the Cos $n_1\theta$ in-plane carrier mode, Sin $n_1\theta$ in-plane response mode and Sin $n\theta$ and Cos $n\theta$ out-of-plane response mode frequencies are matched.

What is claimed is:

1. A gyroscope for sensing rate on at least two axes, including a substantially planar vibratory resonator having a substantially ring or hoop-like shape structure with inner and outer peripheries extending around a common axis, carrier mode drive means for causing the resonator to vibrate in a Cos $n_1\theta$ in-plane carrier mode, where $n_1$ has an integer value of 2 or more, support means for flexibly supporting the resonator and for allowing the resonator to vibrate, in response to the carrier mode drive means, relative to the support means, carrier mode pick-off means for sensing in-plane movement of the resonator, X axis response mode pick-off means for sensing out-of-plane Cos $n\theta$ response mode movement of the resonator in respect to rotation of the gyroscope around the X axis, where n has a value of $n_1+1$ or $n_1-1$, and Y axis response mode pick off means for sensing out-of-plane Sin $n\theta$ response mode movement of the resonator in respect to rotation of the gyroscope about the Y axis, where n has a value of $n_1+1$ or $n_1-1$, identical to that for the X axis response mode.

2. A gyroscope according to claim 1, including X axis response mode drive means for nulling the X axis response mode movement of the resonator to permit the gyroscope to be operated in a forced feedback configuration.

3. A gyroscope according to claim 1, including Y axis response mode drive means for nulling the Y axis response mode movement of the resonator to permit the gyroscope to be operated in a forced feed back configuration.

4. A gyroscope according to claim 1, wherein for sensing rate about two axes the support means includes a plurality of flexible legs flexibly connecting the resonator to a support, with the number of legs $N_T$ being given by $N_T=4n$ and with the angular separation between the legs being given by $360°/N_T$.

5. A gyroscope according to claim 1, for sensing rate about three axes, including Z axis response mode pick off means for sensing in-plane Sin $n_1\theta$ response mode movement of the resonator in respect to rotation of the gyroscope around the Z axis, where $n_1$ has an integer value of 2 or more, identical to that for the in-plane carrier mode.

6. A gyroscope according to claim 5, including Z axis response mode drive means for nulling the Z axis response mode movement of the resonator to permit the gyroscope to be operated in a forced feedback configuration.

7. A gyroscope according to claim 5, wherein the support means includes a plurality of flexible legs flexibly connecting the resonator to a support, with the number of legs $N_T$ being given by $N_T=4nn_1$ and with the angular separation between the legs being given by $360°/N_T$.

8. A gyroscope according to claim 2, for sensing rate about two axes, wherein the carrier mode is an in-plane Cos 2 $\theta$ mode, with the carrier mode drive means including two drive elements, for initiating the carrier mode motion, located at 0° and 180° with respect to a fixed reference axis in the plane of the resonator, with the carrier mode pick off means including two pick off elements, for detecting the carrier mode motion, located at 90° and 270° with respect to the fixed reference axis, wherein the X axis response mode is a Cos 3 $\theta$ mode, with the X axis pick off means including three pick off elements located at 0°, 120°, and 240° with respect to the fixed reference axis, with the X axis drive means including three drive elements located at 60°, 180° and 300° with respect to the fixed reference axis, and wherein the Y axis response mode is a Sin 3 $\theta$ mode, with the Y axis pick off means including three pick off elements located at 30°, 150° and 270° with respect to the fixed reference axis and with the Y axis drive means including three drive elements located at 90°, 210° and 330° with respect to the fixed reference axis, which X and Y axis drive and pick off elements are operable to detect and nullify the response mode motions.

9. A gyroscope according to claim 2, wherein the carrier mode is an in-plane Cos 3 $\theta$ mode, with the carrier mode drive means including three drive elements located at 0°, 120° and 240° with respect to a fixed reference axis in the plane of the resonator, with the carrier mode pick off means including three pick off elements located at 60°, 180° and 300° with respect to the fixed reference axis, wherein the X axis response mode is a Cos 2 $\theta$ mode, with the X axis pick off means including two pick off elements located at 0° and 180° with respect to the fixed reference axis, with the X axis drive means including two drive elements located at 90° and 270° with respect to the fixed reference axis, and wherein the Y axis response mode is a Sin 2 $\theta$ mode, with the Y axis pick off means including two pick off elements located at 45° and 225° with respect to the fixed reference axis and with the Y axis drive means including two drive elements located at 135° and 315° with respect to the fixed reference axis.

10. A gyroscope according to claim 2, wherein the carrier mode is an in-plane Cos 3 $\theta$ mode, with the carrier mode drive means including three drive elements located at 0°, 120° and 240° with respect to a fixed reference axis in the plane of the resonator, with the carrier mode pick off means including three pick off elements located at 60°, 180° and 300° with respect to the fixed reference axis, wherein the X axis response mode is a Cos 4 $\theta$ mode, with the X axis pick off means including four pick off elements located at 0°, 90°, 180° and 270° with respect to the fixed reference axis, with the X axis drive means including four drive elements located at 45°, 135°, 225° and 315° with respect to the fixed reference axis and wherein the Y axis response mode is a Sin 4 $\theta$ mode, with the Y axis pick off means including four pick off elements located at 22.50, 112.5° and 292.5° with respect to the fixed reference axis and with the Y axis drive means including four drive elements located at 67.5°, 157.5°, 247.5° and 337.5° with respect to the fixed reference axis.

11. A gyroscope according to claim 8, for sensing rate of three axes, include Z axis response mode pick off means for sensing in-plane Sin 2 $\theta$ response mode movement of the resonator, which Z axis pick off means includes two pick off elements located at 45° and 225° with respect to the fixed reference axis, and including Z axis response mode drive means having two drive elements located at 135° and 315° with respect to the fixed reference axis.

12. A gyroscope according to claim 9, for sensing rate on three axes, includes Z axis response mode pick off means for sensing in-plane Sin 3 $\theta$ response mode movement of the resonator, which Z axis pick off means includes three pick off elements located at 90°, 210° and 330° with respect to the fixed reference axis, and including Z axis response mode drive means having three drive elements located at 30°, 150° and 270° with respect to the fixed reference axis.

13. A gyroscope according to claim 1, wherein the resonator is made from metal quartz, polysilicon or bulk silicon.

14. A gyroscope according to claim 2, including Y axis response mode drive means for nulling the Y axis response mode movement of the resonator to permit the gyroscope to be operated in a forced feed back configuration.

15. A gyroscope according to claim 2, wherein for sensing rate about two axes the support means includes a plurality of flexible legs flexibly connecting the resonator to a support, with the number of legs $N_T$ being given by $N_T=4$ n and with the angular separation between the legs being given by $360°/N_T$.

16. A gyroscope according to claim 3, wherein for sensing rate about two axes the support means includes a plurality of flexible legs flexibly connecting the resonator to a support, with the number of legs $N_T$ being given by $N_T=4$ n and with the angular separation between the legs being given by $360°/N_T$.

17. A gyroscope according to claim 2 for sensing rate about three axes, including Z axis response mode pick off means for sensing in-plane Sin $n_1\theta$ response mode movement of the resonator in respect to rotation of the gyroscope around the Z axis, where $n_1$ has an integer value of 2 or more, identical to that for the in-plane carrier mode.

18. A gyroscope according to claim 3 for sensing rate about three axes, including Z axis response mode pick off means for sensing in-plane Sin $n_1\theta$ response mode movement of the resonator in respect to rotation of the gyroscope around the Z axis, where $n_1$ has an integer value of 2 or more, identical to that for the in-plane carrier mode.

* * * * *

UNITED STATES PATENT AND TRADEMARK OFFICE
CERTIFICATE OF CORRECTION

PATENT NO. : 6,343,509 B1  Page 1 of 1
DATED : February 5, 2002
INVENTOR(S) : Christopher Fell et al.

It is certified that error appears in the above-identified patent and that said Letters Patent is hereby corrected as shown below:

<u>Column 4,</u>
Line 67, change "motio" to -- motion --.

<u>Column 7,</u>
Line 57, change "150" to -- 15º --.

Signed and Sealed this

Twenty-fifth Day of June, 2002

Attest:

Attesting Officer

JAMES E. ROGAN
Director of the United States Patent and Trademark Office